United States Patent [19]

Harris

[11] Patent Number: 5,542,687
[45] Date of Patent: Aug. 6, 1996

[54] SHOPPING CART WITH PURSE SECURITY ENCLOSURE

[76] Inventor: Marian R. Harris, N2504 Cleghorn Rd., Waupaca, Wis. 54981

[21] Appl. No.: 560,896

[22] Filed: Nov. 20, 1995

[51] Int. Cl.⁶ ........................................ B62B 3/02
[52] U.S. Cl. ................ 280/33.993; 280/33.994; 280/DIG. 4
[58] Field of Search .................. 280/33.991, 33.992, 280/33.993, 33.994, DIG. 4; 224/411

[56] References Cited

U.S. PATENT DOCUMENTS

| | | | |
|---|---|---|---|
| 3,861,633 | 1/1975 | Rappleye et al. | 248/227 |
| 4,361,340 | 11/1982 | Soriano | 280/33.992 |
| 5,002,292 | 3/1991 | Myers | 280/33.992 |
| 5,012,966 | 5/1991 | Turner et al. | 280/33.992 X |

FOREIGN PATENT DOCUMENTS

| | | |
|---|---|---|
| 2532605 | 9/1982 | France. |
| 2325685 | 12/1974 | Germany. |
| 2264856 | 4/1975 | Germany. |

*Primary Examiner*—Eric D. Culbreth
*Assistant Examiner*—Michael Mar
*Attorney, Agent, or Firm*—Ryan, Maki, Mann & Hohenfeldt, S.C.

[57] ABSTRACT

A panel adapted to engage the supporting frame of an infant seat support in a shopping cart and to pivot downwardly through the bottom of the merchandise compartment of said cart to form a secure generally triangular enclosure in said cart for placement therein of a shopper's purse or other valuables. The enclosure is unlocked but by coaction with merchandise placed in the cart formes a deterrent against theft of said purse or valuables.

5 Claims, 3 Drawing Sheets

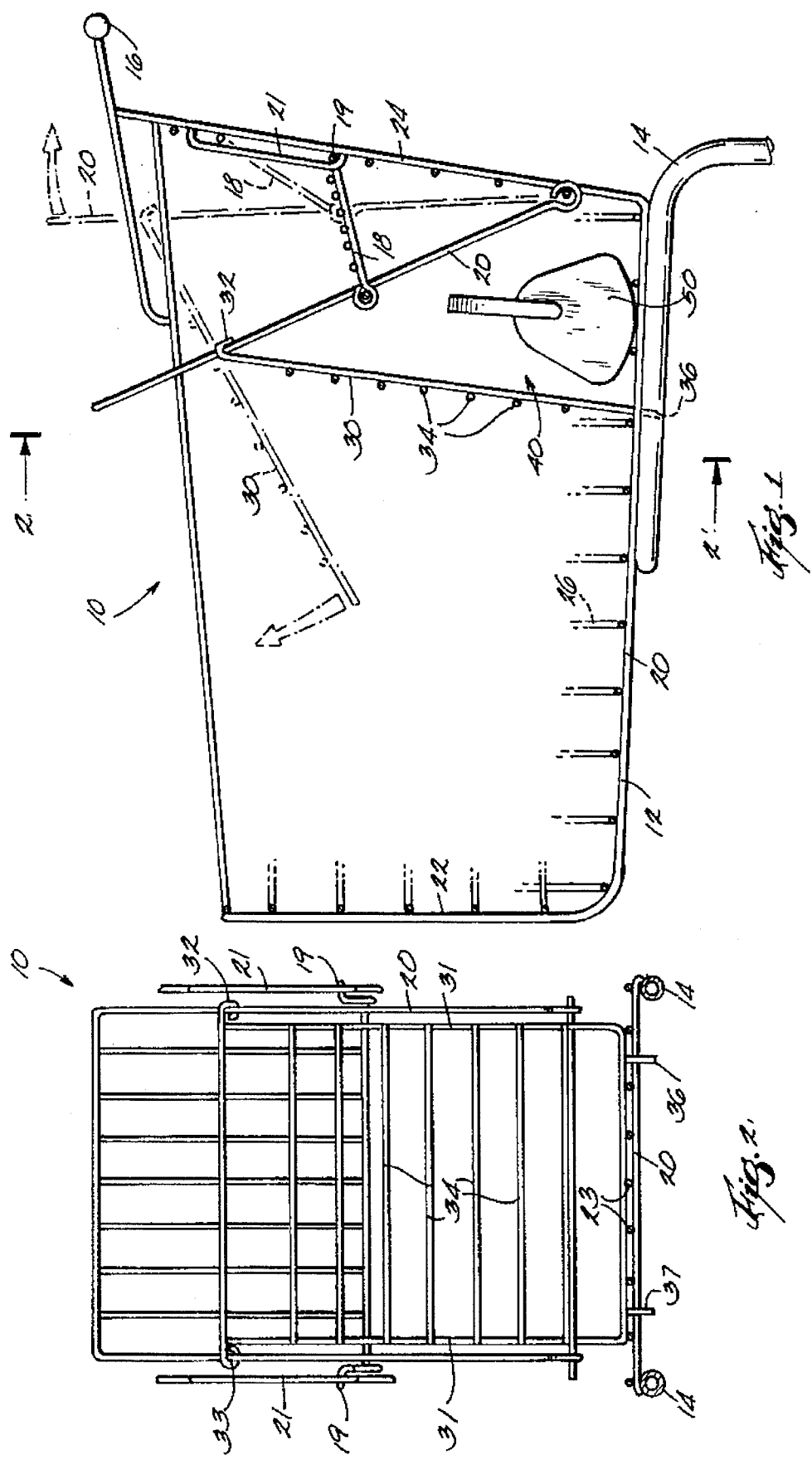

SHOPPING CART WITH PURSE SECURITY ENCLOSURE

FIELD OF THE INVENTION

The present invention relates to shopping carts of the type used in retail establishments. More specifically the invention relates to such carts having a security enclosure for temporary storage of purses and similar personal property of the shoppers in order to deter theft thereof.

BACKGROUND OF THE INVENTION

Shopping carts are used extensively for retail shopping. The placement of valuables such as a shopper's purse in such a cart has frequently led to theft of the valuables.

Various proposals for providing a secure area in the cart for containing valuables have been proposed. Often such proposals have included the provision for a lock to secure a compartment within which the valuables are placed. See for example U.S. Pat. No. 5,002,292, French No. 2,532,605 and German No. 2,325,685.

With respect to all of the above noted devices there has been little or no commercial acceptance. Apparently the cost and inconvenience of using a lock, with the possible loss of keys and the locks themselves, which were believed necessary to provide a reasonably secure enclosure for purses and the like in order to deter the theft thereof formed a disincentive to acceptance of the devices.

Thus a need has continued to exist for a simple but effective theft deterrent for use in conjunction with shopping carts.

SUMMARY OF THE INVENTION

It is the principal object of the present invention to provide an inexpensive and convenient enclosure in a shopping cart which is sufficient to reasonably deter theft and thereby provides a benefit to shoppers using the cart.

In accordance with an important aspect of the invention the enclosure is formed by materials, for example, metallic gridwork similar to that from which the cart itself is usually constructed. The enclosure of this invention can be added as a feature of such carts during the manufacture thereof, or can be provided as an add-on attachment to existing carts.

In accordance with a further aspect of the invention the enclosure is formed from a material having a flat profile so that an infant seat support mechanism in the shopping cart can be folded into the usual flat configuration, together with the enclosure panel, to allow stacking of a plurality of carts for storage. In accordance with yet a further aspect of the invention the enclosure is formed in part by a metallic mesh panel that is connected at its upper end pivotally to the forward side of a conventional type of infant seat support frame on the cart.

In accordance with a further aspect of the invention the panel forming the security enclosure is slidably attached to the forward side of the child seat support so that it can be lifted to remove the purse or other valuables from the enclosure and can be folded downward to secure the enclosure. In accordance with a still further related aspect of the invention added resistance to opening of the enclosure is provided by placement of merchandise thereagainst by the shopper.

In accordance with another related aspect of the invention the bottom end of the enclosure panel extends downwardly between the openings in the bottom of the merchandise-containing compartment of a shopping cart so that it cannot be opened without lifting.

Further objects and advantages of the invention will be apparent from the following detailed description, the claims and the accompanying drawings.

BRIEF DESCRIPTION OF THE DRAWINGS

FIG. 1 is a fragmentary side elevational view of a shopping cart incorporating the invention with parts shown in alternate positions by means of phantom lines;

FIG. 2 is an elevational view taken along the line 2—2 of FIG. 1;

DETAILED DESCRIPTION OF PREFERRED EMBODIMENT

Figure 3:
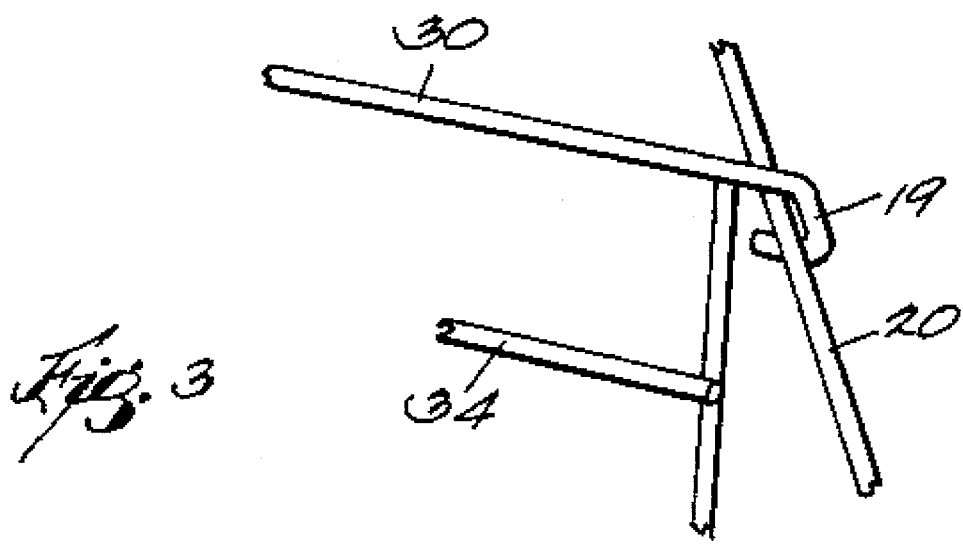
FIG. 3 is a fragmentary perspective view showing the interconnection of slidable components of the invention.

Referring more specifically to the drawings there is seen a shopping cart 10 of conventional design. Cart 10 includes a merchandise carrying compartment 12 supported on a frame 14 which is mounted for travel on wheels in conventional fashion. The shopping cart 10 is also provided with a handle 16 at its upper rear portion for pushing the cart on a floor or walkway. Also in accordance with conventional construction an infant seat 18 is supported on a seat supporting frame 20. Each lateral side 19 of seat 18 is slidably received in a slot 21 on each side of the rear wall 24 of merchandise compartment 12. Compartment 12 includes a forward wall 22 and two lateral walls 26 in addition to bottom surface 24. As shown by phantom lines, infant seat 18 and support panel 20 are pivotable to an upwardly and rearwardly folded position for storage or nesting of a group of carts 10 in customary fashion.

In accordance with the invention, a further panel 30 is provided in order to form a theft deterring enclosure within the merchandise compartment 12. The top lateral sides of panel 30 are preferably slidably connected by fingers 32 and 33 to the sides of seat support 20 as best seen in FIGS. 2 and 3.

Panel 30 is preferably formed by a pair of side members 31 and cross members 34 preferably all formed from stiff metal rods. However, other materials of construction may be substituted as desired. At least two projecting fingers 36 and 37 are attached to the bottom of panel 30. Fingers 36 are length to extend downwardly through bottom panel 24 and are spaced so as to fit between cross grid members 23 of bottom panel 24 as best seen in FIG. 2. When the panel 30 is thus extended downwardly a enclosure 40 is formed within which valuable personal property such as a purse 30 can be stored. Enclosure 40, while not being locked, provides resistance to opening by virtue of the fact that panel 30 is preferably somewhat inclined from the vertical so that merchandise stacked against it forms a deterrent to a thief of articles contained within the enclosure 40.

In order to retrieve the personal property 50 from within enclosure 40, the shopper can move merchandise away from it and then grasp and slide panel 30 upwardly along the lateral edges of seat support 20 to thus remove the property 50. Therefore, while a theft deterrent is provided, it is possible to retrieve property 50 without collapsing the infant seat 18 rearwardly into the folded position. It is thus possible to have merchandise or an infant supported by seat 18 and yet be able to remove the purse or other property 50 at a check out counter.

Figure 4:
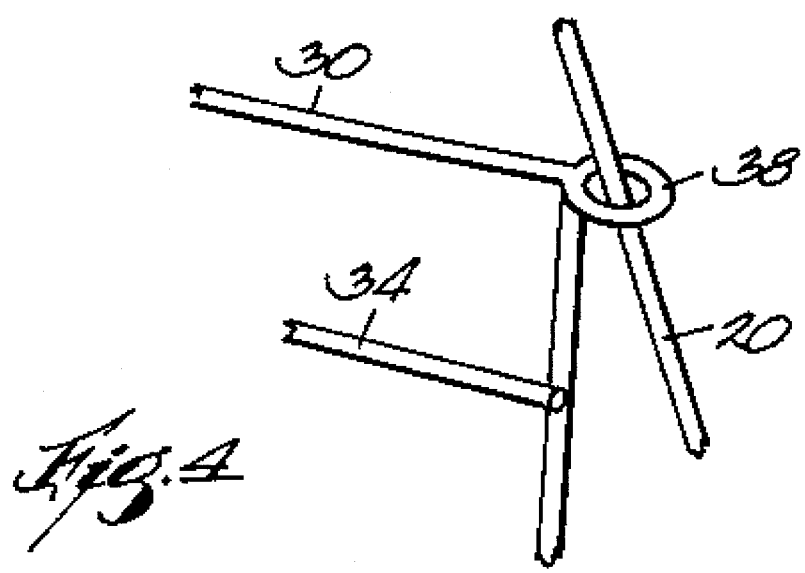
FIG. 4 is a fragmentary perspective view showing an alternate embodiment of the invention; and, FIG. 5 is a fragmentary side elevational view of a shopping cart incorporating a somewhat modified embodiment of the invention with parts shown in alternate positions by means of phantom lines.

In FIG. 4 rings 38 are provided as an alternative to the fingers 32 shown in FIGS. 1–3. Other types of slidable connections can be substituted, as well.

Figure 5:
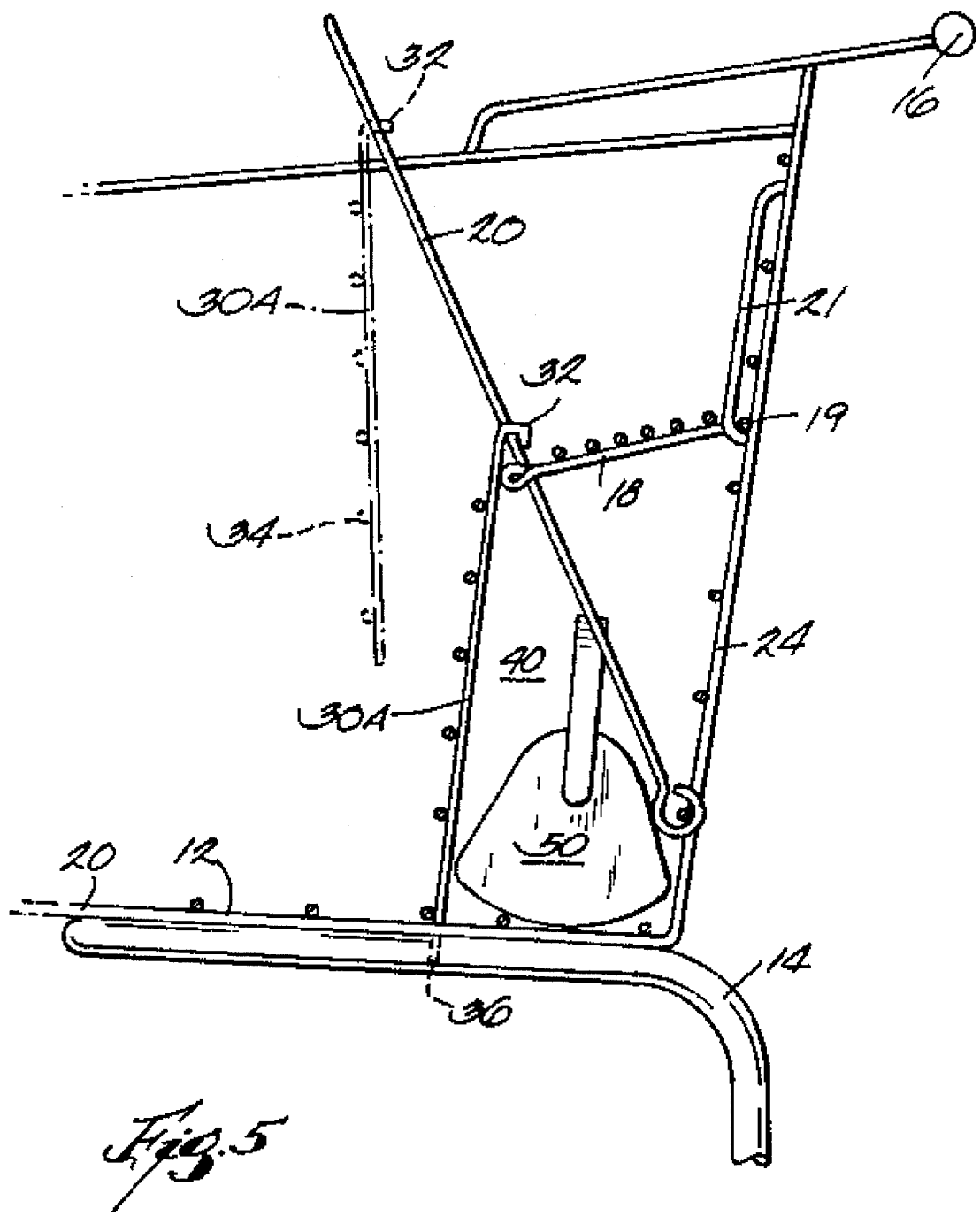

In the embodiment of FIG. 5 panel 30A is of a somewhat reduced height. This arrangement facilitates vertical raising of panel 30A along member 20 without the need for pivoting thereof. Thus purse 50 can be retreived at the checkout counter without the need for collapsing the infant seat 18 or complete emptying of the merchandise compartment 12.

While the illustrated cart 10 is formed from heavy metal wire or rod in conventional fashion, it will be understood that some or all parts of the cart 10 can also be formed from other materials of construction such as molded plastic.

While preferred embodiments of the invention have been shown for purposes of illustration it will be understood by those skilled in the art that various other substitutions of components can be made without departing from the spirit of the invention. Thus the invention should be limited only by the true scope of the appended claims including reasonable equivalents thereof.

What is claimed is:

1. In a shopping cart formed from a rigid gridwork and having a forwardly pivoting infant seat support mechanism at a rearward end thereof, said seat support mechanism being located in a merchandise carrying compartment that has a bottom surface, opposed side walls and front and back walls, said seat support mechanism including a seat support frame pivotally connected at a lower end to said merchandise carrying compartment, and said shopping cart being provided with wheels and a handle for movement thereof, the improvement which comprises a panel having top and bottom ends and side edges, said panel being slidably and pivotally attached at its top end to said seat support frame and positioned forwardly thereof;

the bottom end of said panel having a plurality of projections adapted to extend downwardly through openings in said bottom surface of said merchandise compartment;

whereby said panel can be moved to a closed position, when the top end of said seat support frame is in a forwardly pivoted position to form an enclosure between said panel and said seat support frame by sliding the same downwardly so that said projections extend through said bottom surface and can be pivoted to an open position when the top end thereof is moved slidably upward along said seat support frame.

2. A shopping cart according to claim 1 wherein said panel is formed from a metallic gridwork.

3. A shopping cart according to claim 1 wherein said panel is attached at said upper end at opposed lateral sides thereof by being slidably affixed to said infant seat support frame.

4. A shopping cart according to claim 1 wherein said panel is attached to said seat support frame by means of laterally projecting curved fingers which engage frame members of said seat support frame.

5. A shopping cart according to claim 2 wherein a ring circumscribing a component of said seat support frame affixes said panel slidably thereto.

* * * * *